Aug. 16, 1949.　　　A. R. AINSWORTH　　　2,479,092
ELECTRIC ARC STUD WELDING APPARATUS
Filed April 12, 1948　　　　　　　　　　　　5 Sheets-Sheet 1

Inventor
Arthur Ratcliffe Ainsworth
By Stevens, Davis, Miller & Mosher
his attorneys Aug. 16, 1949.  A. R. AINSWORTH  2,479,092
ELECTRIC ARC STUD WELDING APPARATUS
Filed April 12, 1948  5 Sheets-Sheet 2

Aug. 16, 1949.   A. R. AINSWORTH   2,479,092
ELECTRIC ARC STUD WELDING APPARATUS
Filed April 12, 1948   5 Sheets-Sheet 3
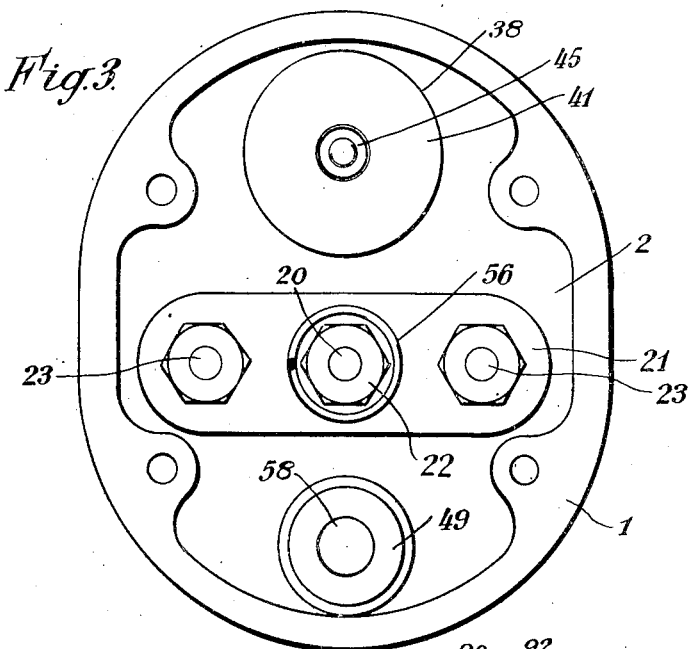
Fig.3.
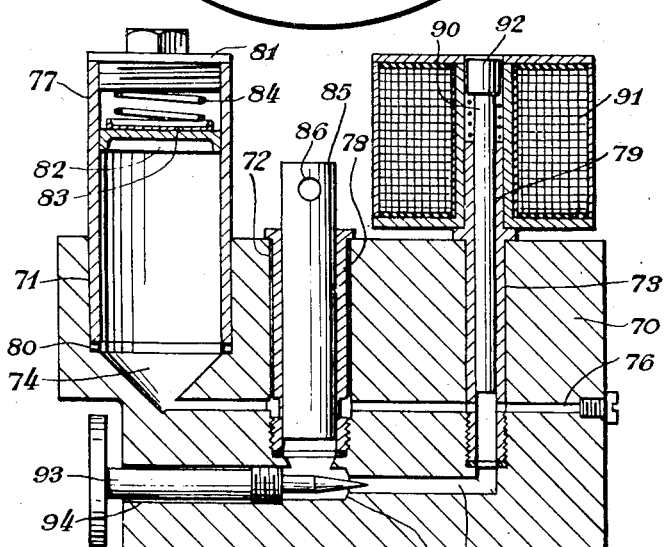
Fig.4.
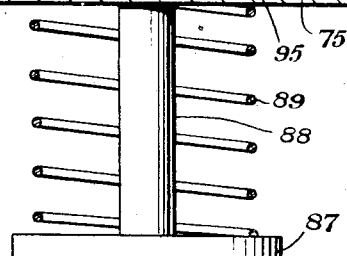

Aug. 16, 1949.  A. R. AINSWORTH  2,479,092
ELECTRIC ARC STUD WELDING APPARATUS
Filed April 12, 1948  5 Sheets-Sheet 4

Aug. 16, 1949.  A. R. AINSWORTH  2,479,092
ELECTRIC ARC STUD WELDING APPARATUS
Filed April 12, 1948  5 Sheets-Sheet 5

Patented Aug. 16, 1949

2,479,092

UNITED STATES PATENT OFFICE 2,479,092

ELECTRIC ARC STUD WELDING APPARATUS

Arthur Ratcliffe Ainsworth, London, England, assignor to Cyc-Arc Limited, London, England, a British company Application April 12, 1948, Serial No. 20,426
In Great Britain November 24, 1947

19 Claims. (Cl. 219—4)

This invention relates to electric arc stud welding apparatus, whereby metal or alloy studs, tubes and the like may be welded to metal or alloy plates, bodies and the like by a method in which the stud or the like (hereinafter termed "the stud") and the plate or the like (hereinafter termed "the plate") are adapted to function as electrodes connected in the welding circuit and between which electrodes the arc is struck, the stud being first contacted with the plate and the welding circuit being then closed, whereupon the stud is withdrawn through a short distance from the plate to strike the arc, the arc being maintained for the period required for the surfaces to be welded to acquire a satisfactory welding temperature, the stud being then pressed upon the plate to effect the weld, and the flow of current in the welding circuit being maintained for the period necessary for the completion of a satisfactory weld.

The invention has among its objects to provide an electric arc welding apparatus that is self-adjusting to operate with studs of differing lengths within its capacity, to provide an apparatus in which the movement of the stud to strike the arc is effected through the medium of a body of liquid contained within the apparatus and to provide an apparatus in which the rapidity of the movements of the stud may be readily determined at the will of the operator.

According to the invention the apparatus is provided with a chuck or holder for the stud that is in fixed relation with a piston or plunger that is movable in a cylinder or chamber into which may be forced a liquid that is subjected to the pressure of an operating ram, the liquid being confined between the piston or plunger and the ram and the latter being caused to become operative at the will of the operator.

The ram is advantageously caused to take up an inoperative position in which it opens communication between the cylinder or chamber and a storage chamber of variable capacity in which is confined a volume of the liquid which, if necessary, under a slight pressure, is caused to follow any movement of the piston or plunger whereby the space available to the liquid in the cylinder or chamber is increased, except when the ram is operative to break the communication. Thus, when a stud is charged into the chuck or holder of the apparatus and the apparatus is set in the operative position in relation to the plate to which the stud is to be welded, the piston or plunger is automatically moved into the position determined by the length of the stud, liquid flowing from the storage chamber in the volume necessary to maintain the cylinder or chamber fully charged.

The invention is illustrated, by way of example, in the accompanying diagrammatic drawings representing several embodiments.

Figure 3 is a plan view of the tool represented in Figures 1 and 2, the cover plate being removed.

Figure 4 is a sectional elevation of a modified construction of portable or hand tool according to the invention, the cover plate and the supports being omitted.

In any embodiment of the invention it is preferred to include certain advantageous features, with a view to securing a high degree of efficiency in operation and ease of control.

The ram is advantageously actuated electromagnetically, for example, by the transmission or application of the movement of the core of a solenoid to the ram. The control of the operation of the apparatus may be effected electrically.

The return of the stud to the plate is advantageously effected by the action of a spring that may be operative, for example, upon the chuck or holder or upon the piston or plunger.

Since the rapidity of the movements of the stud in relation to the plate requires to be controlled according to the diameter of the stud and related considerations, it is advantageous to provide for the control or regulation of the cross-sectional area of the passage or conduit by which the liquid flows to the cylinder or chamber from the space in which the ram operates. For the purpose, a needle or other like valve may advantageously extend into a seating formed in the passage or conduit and may be provided under the control of a screw-threaded control rod that may be fitted with an adjusting head adapted to be adjusted at the will of the operator, according to a scale of stud diameters that may be provided upon the head or upon an adjacent part of the body of the apparatus.

The storage chamber may be merely in the form of a cylinder with a piston mounted under the action of a spring exerting a light pressure. It is advantageous, however, to provide for the variation of capacity of the chamber by forming it either with a flexible diaphragm or of a bellows construction.

Figure 1:
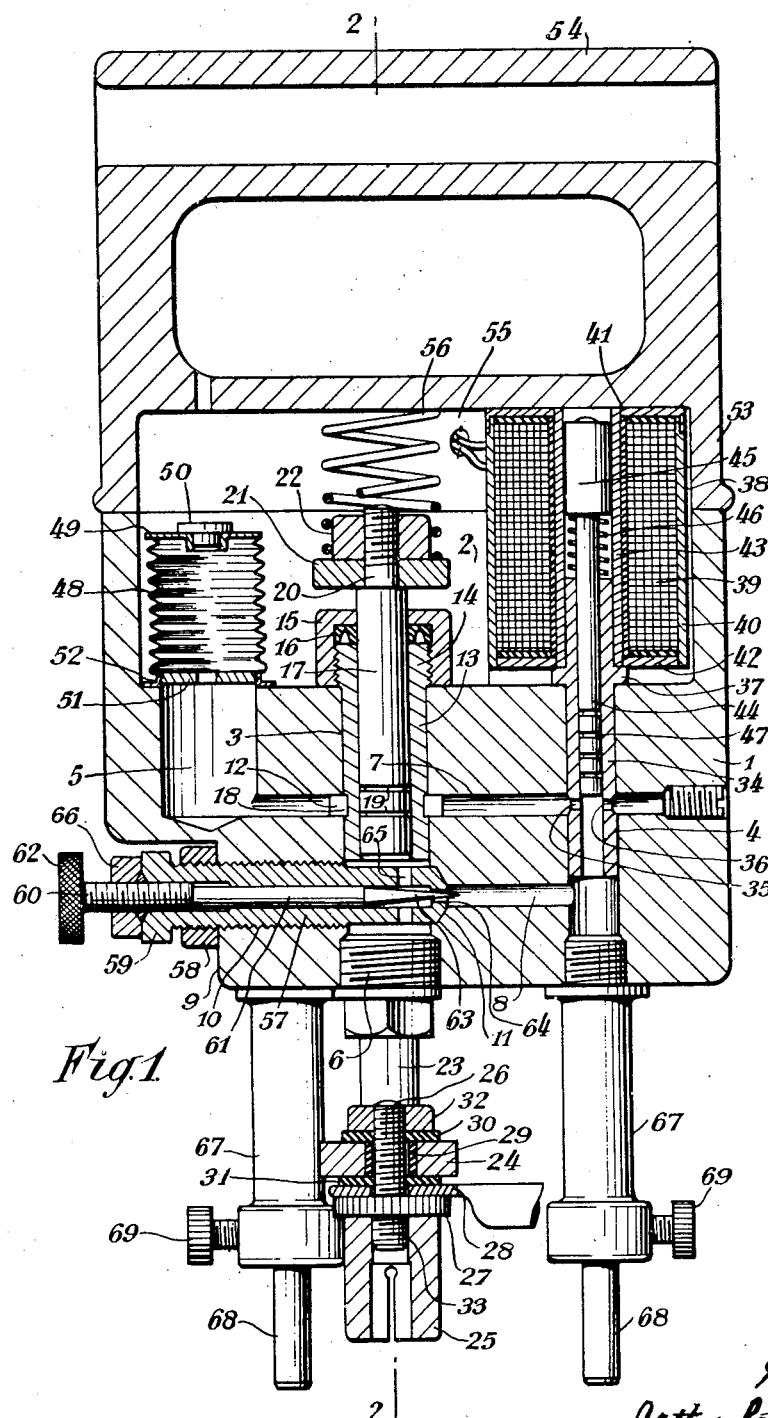
Figure 1 is a sectional elevation of a portable or hand tool according to the invention.
Figure 2:
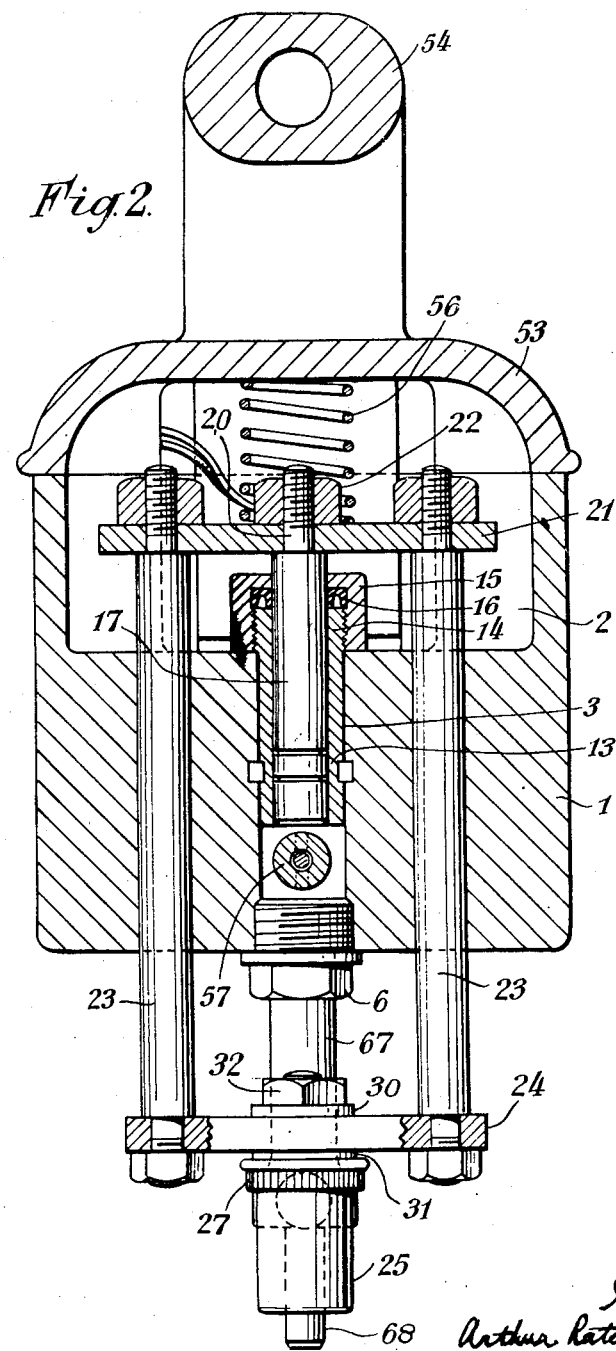
Figure 2 is a sectional elevation on the line 2—2 in Figure 1.
Figure 5:
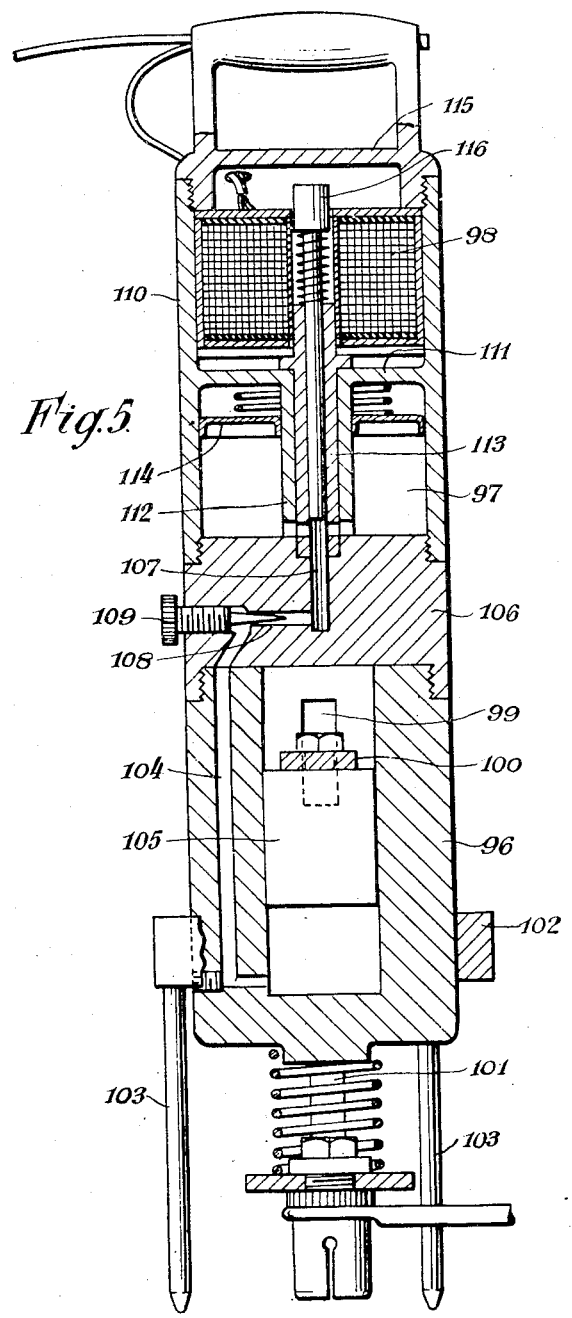
Figure 5 is a sectional elevation of a further modification in construction of the portable or hand tool according to the invention.
Figure 6:
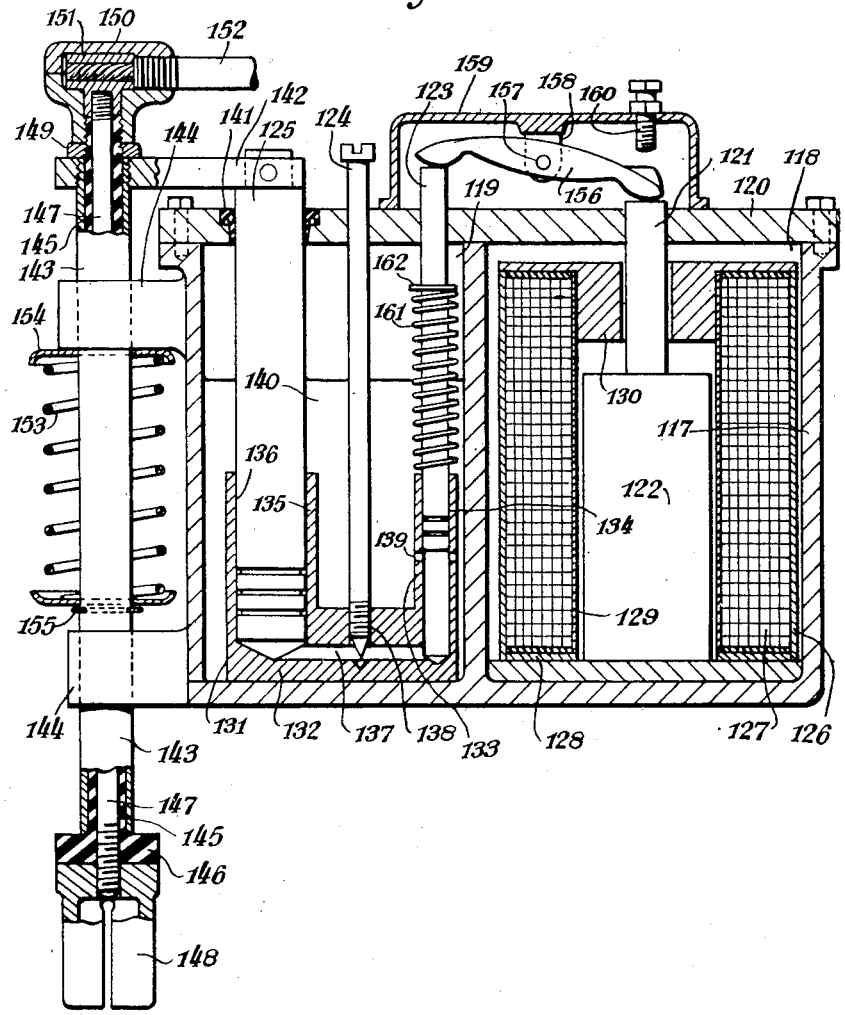
Figure 6 is a sectional elevation of a construction of apparatus according to the invention adapted for use upon a machine tool, such as a drilling machine.

In carrying the invention into effect, by way of example, in the application to a portable or hand tool as represented in Figures 1 to 3 of the accompanying drawings, the body 1 of the tool is conveniently a block of a metal, such as steel, or a light alloy, such as aluminium silicon, substantially oval or elliptical in plan and having the upper and lower faces parallel, the upper face being deeply recessed, as at 2, to a depth approximating to half the depth of the body. On the major axis the bottom of the recess is pierced by three spaced cylindrical bores 3, 4, 5. The middle bore 3, which may extend to the lower face of the body and there be plugged by a screwed plug 6, is adapted to serve as the cylinder to receive the piston or plunger, while one of the outer bores 4, intended to receive the ram, may also extend to the lower face of the body and be plugged. The third bore 5, which may be of less depth, is required merely to form a passage for communication with the storage chamber, as hereinafter described. The block is bored parallel with the upper and lower faces for the formation of two passages 7 and 8, the upper 7 of which extends transversely through the ram bore 4 and the cylinder bore 3 and ends where it meets the third bore 5, while the lower passage 8 is formed in a plane surface 9 recessed laterally in the end of the block 1 beneath the third bore and extends transversely through the cylinder bore 3 and ends in the ram bore 4. The passage 8 is of two diameters, the part 10 of larger diameter extending from the outer end and ending in an annular coned face 11 after traversing the cylinder bore 3. The part 10 of the passage is screw-threaded. The cylinder bore may be formed with a peripheral enlargement 12 at the position at which the upper passage 7 traverses it.

The cylinder bore 3 is provided with a liner 13 which may be of brass, bronze or other material, that is of a length to extend short of the lower passage and to project from the bore to an extent to form a head 14 of slightly increased diameter, that is screw-threaded to receive a gland nut 15 adapted to confine a flexible packing ring 16 upon the head and about the piston or plunger 17. The outer surface of the liner may be formed with a peripheral channel 18 at the position at which the upper transverse passage traverses it. The piston or plunger 17 is advantageously of such length that when the lower end is at the level of the lower end of the liner 13 the upper end is clear of the gland nut 15. The lower part of the piston or plunger is formed with several peripheral oil grooves 19 and the upper end is formed with an axial part 20 of reduced diameter adapted to fit a bore in a transverse crosshead 21, the upwardly protruding part being screw-threaded to receive a clamping nut 22. The crosshead is similarly secured, in positions equally spaced from the piston, to two slide rods 23 that extend through clearance holes bored through the body from the bottom of the recess 2 in the upper face. Beneath the body the slide rods are similarly secured to a transverse carrier 24 for the stud chuck 25. The carrier 24 is bored for the passage of the upwardly directed screwed stem 26 of a metal disc 27, which stem passes through the eye 28 of the supply conductor and through a bush 29 of insulating material fitting the hole in the carrier and insulating discs 30, 31 above and beneath the carrier and is clamped in position by a nut 32 received upon the upwardly projecting end. The chuck 25 conveniently screws upon a short downwardly extending screwed stem 33 of the metal disc 27 so that it may be readily exchanged. It advantageously engages the studs by friction, being slotted for the purpose.

The ram bore 4 is similarly lined with a liner 34, of brass, bronze or other material, or of a magnetic material, that extends short of the lower transverse passage 8 and in the plane of the upper transverse passage 7 is formed with one or more transverse holes 35, affording communication between the upper transverse passage and the interior of the liner. The liner may at this position be formed with a peripheral channel 36, whereby liquid may flow around it and thus enter from more than one position. The liner is advantageously provided with a peripheral flange 37 which seats upon the bottom of the recess 2 in the body 1, and is extended upwardly to form a means of location and centering for a solenoid 38, the coil 39 of which is enclosed in an outer cylinder 40 and upper and lower rings 41 and 42 of magnetic material and a tubular lining 43 of non-magnetic material. The liner extends only partially into the bore of the solenoid.

The ram 44 is provided as a plunger of non-magnetic steel, slidably fitting the bore of the liner 34, and having the upper part reduced in cross-section and adapted to receive a solenoid core 45 or armature of magnetic material. The length of the ram advantageously is such that the lower end is positioned immediately above the transverse holes 35 in the liner 34 when the core 45 is in its uppermost and inoperative position with respect to the solenoid 38. The ram 44 is conveniently assisted to take up the inoperative position of the core by means of a helical spring 46 surrounding it and positioned between the upper end of the liner and the lower face of the core. The ram is advantageously formed with several peripheral oil grooves 47 towards the lower end.

Co-axial with, or off-set from, the third bore, the bottom of the recess 2 supports a cylindrical bellows 48 of rubber, rubber substitute or other flexible material unaffected by oil, which bellows is closed at the upper end by a metal disc 49, conveniently formed with an axial filling plug 50 for the charging of oil into the apparatus. The bellows may be secured in position by means of screws engaging lugs or a flange at the bottom thereof, but is preferably provided at the lower end with a peripherally screw-threaded disc 51 that is received in a screw-threaded seat 52 provided at the bottom of the recess 2.

The body is closed by a cover plate 53 of massive formation provided with a saddle handle 54, or butt handle. The lower face of the cover plate is recessed, as at 55, for the reception of the solenoid 38, the crosshead 21 and the bellows 48. The spring 56, serving to return the piston or plunger in the downward direction is conveniently positioned upon the crosshead 21 around the clamping nut 22 of the piston 17, the spring bearing at the upper end upon the bottom of the corresponding recess in the cover plate.

The part 10 of the lower transverse passage 8 serves to receive a sleeve 57 having the inner end coned to correspond with the coned seating 11 in the passage and having the outer part screw-threaded to be received in the screw thread of the said outer part 10 of the passage. The sleeve is secured in position by a lock nut 58 that bears upon the plane surface 9 recessed laterally in the end of the block 1. The outer end of the sleeve is formed with a hexagonal or other head 59, and the outer part of the bore is screw-threaded to receive the screw-threaded outer part of a needle valve 60, the inner part 61 of which slidably fits the inner part of the sleeve and thus permits, by rotation of the valve head 62, the adjustment of the coned end 63 in an axial opening 64 at the inner end of the sleeve 57. The latter is provided with one or more transverse holes 65 that afford communication with the cylinder bore 3. The adjusted position of the needle valve 60 may be determined by a lock nut 66 that bears upon the head 59 of the sleeve.

The tool is adapted to be supported from the surface upon which studs are required to be welded by means of three similar supports each consisting of a sleeve 67, in which is slidably fitted a rod 68, the extension of the rods from the sleeves being determined by clamping screws 69. It is convenient for one of the sleeves to be mounted in position in, and to serve as the plug for, the lower end of the ram bore 4.

While the bellows construction is advantageous for the formation of the storage chamber, the latter may, as hereinbefore stated, be alternatively formed merely as a cylinder and piston. For this purpose, for example, the recess in the upper face of the block may be reduced in area by the provision of a sufficiency of metal in the wall of the recess at the determined position to permit the boring therein of the cylinder to communicate with the third bore before referred to or to take the place of the said bore. The piston may be merely a metal cup carrying a rubber or like cup and may be subjected to the pressure of a helical spring, the upper end of which is received into a recess in the cover plate.

Figure 4 illustrates a construction of a portable or hand tool similar to, but modified from, the construction represented in Figures 1 to 3. The body 70 is not recessed in the upper face but the said face has formed in it, along the major axis in spaced relation, three cylindrical borings 71, 72, 73, of which 71 extends less than half the depth of the body and has the central part continued as a sump 74, of a conical or other shape. The second and third borings 72 and 73 extend only so far as the lower transverse passage 75. The upper transverse passage 76 connects the sump 74 with the borings 72 and 73 while the lower passage 75 connects the lower ends of the said borings. The boring 71 is provided with a liner 77 adapted to serve as the storage chamber, which extends considerably above the upper face of the body to form a cylinder of appreciable capacity, and at their lower ends the liners 77, 78 and 79, of the three borings are set upon annular shoulders or seatings at the lower ends of the borings with the interposition of a packing ring 80 in each case. The lower ends of the liners may be engaged in screw-threaded parts of the borings, as illustrated with respect to the liners 78 and 79. The upper end of the liner 77 is closed by a cap 81 which may be screwed into position. The liner is fitted with a rubber or like piston 82, with a piston cup 83 that is pressed downwardly by a helical spring 84 of a wide range of resilience but of light strength.

The upper end of the liner 78 is flanged to seat upon the upper face of the body and the piston 85 extended above the flange for connection to a crosshead rod 86 which, as in the first construction, is connected to the stud chuck carrier 87 by rods 88. The spring 89 for returning the piston 85 is disposed between the chuck carrier 87 and the lower face of the body 70. The arrangement of the liner 79, the ram 90, the solenoid 91, and solenoid core 92, closely resembles that of the first construction. The needle valve 93 is directly engaged, by screw-thread engagement, in the outer part 94 of the passage 75, and operates directly in the cone seating 95. The tool may be provided with a cover plate and handle (not shown) and be supported from the surface upon which the stud is to be welded by telescopic supports, as in the first construction.

In the operation of such a tool, for example, the tool of Figures 1 to 3, it will be understood that, within the range afforded by the limits of the travel of the piston or plunger 17, allowing for the small movement required for striking the arc, it is possible to charge the chuck 25 with studs of differing lengths and to apply the tool, without any adjustment of the chuck, in position upon the plate to which the stud is to be welded, since the chuck will automatically take up a corresponding position with reference to the body of the tool. This movement is due to the fact that the spring 56, acting upon the crosshead 21, tends always to move the chuck outwards in relation to the body 1, and therefore to cause the piston or plunger to move towards the inner limit of its travel, thus ejecting liquid into the bellows 48, through the transverse passages 8 and 7, the ram 44 being then at the outer limit of its travel. Thus, according to the length of the stud carried by the chuck, the piston or plunger is pressed outwardly, and in consequence draws the liquid from the storage chamber 48, through the two transverse passages and by way of the lower part of the ram bore. When the solenoid 39 is energised for the purpose of striking the arc, the ram 44 is moved forcibly downward in the liner 34, thus interrupting communication between the storage chamber and the lower part of the liner and driving the volume of liquid contained by the said part through the lower passage 8 at a rate determined by the adjustment of the needle valve 60, and thus into the piston cylinder, whereby the piston 17 is moved outwardly to lift the chuck and strike the arc. At the end of the arc period, as determined by convenient timing apparatus (not shown), the solenoid is de-energised so that the spring 56, acting upon the piston or plunger, moves the latter downwardly for the return of the stud to the plate, forcing the liquid beneath it, also at the rate determined by the adjustment of the needle valve, into the lower transverse passage and thus to the liner 34, pressing the ram 44 upwardly, with the assistance of the spring 46 acting upon the solenoid core, to the initial position and thus again opening communication with the storage chamber.

The apparatus hereinbefore described are particularly adapted for use in confined spaces or situations affording small head-room, but the invention is, of course, not limited to such a design. Where the length of the apparatus is of no importance a design may be adopted in which the cylinder 96, the storage chamber 97, and the solenoid 98 are co-axially disposed, thus resulting in an apparatus that has similarity to a common form of pneumatic tool. Thus, the piston cylinder 96 may be lowermost and may have the walls of the upper part diametrically slotted, as at 99, for the reception of the cross-head 100, and the slides or guides 101 may pass through a belt 102, towards the lower end of the cylinder, which belt may also have mounted in it the supporting pins 103. A passage 104 for the admission of liquid beneath the piston 105 may be formed in the wall of the cylinder and the latter may be closed at the upper end by a cap fitting 106, in which is formed the lower part of the ram chamber 107 and a radial passage 108 controlled by the needle valve 109 and communicating with the passage 104 in the wall of the cylinder. Such fitting may also close the lower end of a hollow cylindrical fitting 110 that is partitioned approximately midway and in which the lower face of the partition 111 is formed with a central cylindrical boss 112 that extends into contact with the upper face of the cap fitting 106 and has a through bore adapted to receive the liner 113 of the ram chamber, which liner may extend into the cap fitting 106, the annular space exterior to the boss 112 serving as the storage chamber and housing an annular piston 114 subjected to spring pressure or alternatively an annular bellows. Communication between the storage chamber and the ram chamber may be afforded by a channel formed in the lower end face of the boss that registers with ports in the liner 113. The solenoid 98 is received in the upper space of the cylindrical fitting 110, which may be closed by a cover plate 115, formed with a central space to receive the upper part of the solenoid core 116, when the latter is in the inoperative position, the cover plate being provided with a butt or D handle.

If it is preferred to avoid the use of a crosshead and slides or guides in any of the foregoing designs of apparatus, a central extension of the piston may project downwardly through a gland for connection directly to the chuck carrier. This construction, however, is open to the disadvantage that it is necessary to offset the lower passage and the needle valve and to provide corresponding connecting passages.

In the design of a tool adapted for use upon a machine tool, such as a drilling machine, or for incorporation in a specially designed fixed base apparatus, the body of the tool may comprise a simple tank-like metal structure 117 having the interior formed as two cylindrical compartments 118, 119, in close proximity but with an intervening wall. Such a structure may be closed at the upper end by a flat cover plate 120 bored in the required positions to permit protrusion of the stem 121 of the solenoid core 122, the ram 123, the needle valve 124, and the piston 125. The solenoid 126, comprising the coil 127 and an outer enclosure 128 of magnetic material with a brass, fibre or like tubular inner lining 129, is positioned in the compartment 118, of the structure upon the base thereof, with the core 122 when inoperative, resting upon the lower end, and having the stem 121 passing through a clearance hole in the upper disc 130 of the enclosure of the solenoid and extending through the cover plate 120. In the compartment 119 of the structure there is received a U-shaped fitting 131 having a circular base 132. One limb 133 of the fitting 131 is bored to serve as the ram bore 134, and the other limb 135 bored to serve as the piston cylinder 136. The two bores conveniently communicate by a transverse passage 137 in the base 132, and the needle valve 124 is adjustably mounted in an intermediate bore 138, so provided that the cone of the needle may, according to the adjustment of the stem of the valve, close to a greater or lesser extent such communication. The base 132 of the fitting is secured, as by means of screws, to the bottom of the compartment 119. The wall of the ram bore 134 is perforated with one or more transverse openings 139, and the compartment is flooded with oil or other selected liquid 140, to a level such that the fitting 131 is entirely immersed. The piston 125 extends through a flexible packing ring 141 mounted in the cover plate 120, and is adapted to receive a crosshead 142, which supports a tubular chuck carrier 143 disposed parallel with the piston and slidably fitted in bearing bores in spaced bearing lugs 144 formed upon the wall of the structure 117. The carrier 143 is advantageously lined with bushes or an inner tube 145 of insulating material having a massive peripheral flange 146 at the lower end to bear upon the end of the carrier. A rod of copper or a like conductor 147 is received in the inner tube, and has its lower protruding end screw-threaded to engage screw-threads in the tube 145 and in the bore of the chuck 148. Above the crosshead the inner tube may be secured by a nut 149, while the rod may extend into an insulating enclosure 150 to engage a conducting socket 151 for the supply cable 152, which socket may screw upon or be otherwise engaged with the rod 147.

The spring 153, for effecting the return of the stud to the plate is conveniently coiled about the carrier 143, between the supporting cups or discs 154, the lower of which is constrained in position by a spring ring or collar 155, secured upon the carrier at such a distance from the lower bearing lug 144 as to permit the required travel of the carrier, while the upper disc may bear against the upper bearing lug 144.

The movement of the solenoid core is conveniently transmitted to the ram by a lever 156, that is mounted with the fulcrum pin 157 in a fork-like bearing 158, formed or fitted in the bottom of an auxiliary cover plate or hood 159, that is adapted to be fitted upon the cover plate 120. Such hood may carry an adjusting screw 160, adapted to determine the extent of travel of the lever 156, or of the solenoid core 122. The spring 161, for assisting the return of the ram 123, may be positioned between the upper end of the corresponding limb of the fitting 131, and a collar or spring ring 162 carried by the ram.

In any construction of the apparatus according to the invention, it will be appreciated that the chuck may be readily offset from the axis of movement of the carrier merely by suitable and corresponding formation of the carrier or by the provision of a supplementary laterally projecting carrier. Such an arrangement permits the welding of studs or the like of unlimited length, if the chuck is of a design that allows the stud or the like to project from the upper side of the chuck.

Provision may be made in any construction of the apparatus for the adjustment of the strength of the spring returning the piston assembly after the lift of the stud or the like.

I claim:
1. Electric arc stud welding apparatus, for welding objects in the form of studs, rivets, tubes and the like to the surfaces of plates, bodies and like masses, comprising a body adapted for support in an operative position over the surface to which an object is to be welded and having therein a cylinder and a bore spaced apart, a piston movable in the cylinder, a chuck for the object movable by and with the piston, a ram movable in the bore, a passage connecting the spaces at the inner ends of the said bore and the said cylinder, a fluid medium filling the passage, the bore and the cylinder between the ram and the piston, operating means for moving the ram in the said bore, and means tending to move the piston in the direction to expel the fluid medium from the cylinder.

2. Electric arc stud welding apparatus according to claim 1, comprising also a storage chamber for the fluid medium, and a passage in the body connecting the storage chamber with the bore at a position immediately in advance of the ram when the latter is in the limiting outer position in the bore.

3. Electric arc stud welding apparatus according to claim 1, having the cylinder and the bore formed in a fitting disposed within a sump in the body, the sump being charged with fluid for the immersion of the fitting.

4. Electric arc stud welding apparatus according to claim 1, having a regulating valve mounted in the body and adapted to control the rate of flow of the fluid medium through the passage between the cylinder and the bore.

5. Electric arc stud welding apparatus according to claim 1, having the cylinder and the bore formed in a fitting disposed within a sump in the body, the sump being charged with fluid for the immersion of the fitting, and a regulating valve mounted in the fitting for the control of the cross-sectional area of the passage between the cylinder and the bore.

6. Electric arc stud welding apparatus comprising a body, supporting means upon the said body to maintain it in determined disposition upon the surface to which a stud is to be welded, a cylinder and a bore in parallel relation in the said body, a passage extending between the lower end of the cylinder and the lower end of the bore, a piston in the said cylinder, a stud chuck in fixed relation to the piston and positioned below the body, a spring acting upon the assembly comprised by the piston and stud chuck to move the piston in the direction of the lower end of the cylinder, a ram in the said bore, a solenoid coil surrounding the upper part of the bore, a solenoid armature in fixed relation to the upper end of the ram, and a handle member applied to the said body.

7. Electric arc stud welding apparatus according to claim 6, having a cross-head positioned at the upper end of the piston, a carrier for the stud chuck and guide rods connecting the cross-head with the chuck carrier.

8. Electric arc stud welding apparatus according to claim 6, comprising also a storage chamber of variable capacity provided in the said body, and a passage within the body extending between the said storage chamber and the bore at a position beneath the ram when the ram is in the extreme outward position in the bore.

9. Electric arc stud welding apparatus according to claim 6, comprising a regulating valve adjustably mounted in the body in a position to determine by adjustment the cross-sectional area of the passage extending between the cylinder and the bore.

10. Electric arc stud welding apparatus according to claim 6, comprising also a storage chamber of variable capacity provided in the said body, a passage extending between the said storage chamber and the bore at a position beneath the ram when the latter is in its outermost position, and a regulating valve positioned in the body and serving by adjustment to determine the cross-sectional area of the passage communicating between the cylinder and the bore.

11. Electric arc stud welding apparatus according to claim 6, comprising also a storage chamber of variable capacity provided in the said body, a passage extending between the said storage chamber and the bore at a position beneath the ram when the latter is in its outermost position, and a regulating valve positioned in the body and serving by adjustment to determine the cross-sectional area of the passage communicating between the cylinder and the bore, the storage chamber being in the form of a bellows closed at the two ends but communicating at one end with the passage.

12. Electric arc stud welding apparatus according to claim 6, comprising also a storage chamber of variable capacity provided in the said body, a passage extending between the said storage chamber and the bore at a position beneath the ram when the latter is in its outermost position, and a regulating valve positioned in the body and serving by adjustment to determine the cross-sectional area of the passage communicating between the cylinder and the bore, the storage chamber comprising a cylinder, a piston in the said cylinder and a spring acting upon the said piston.

13. Electric arc stud welding apparatus comprising a body, a cylinder and a bore in axial disposition in the said body, a passage extending between the lower end of the bore and the lower end of the cylinder, a piston in the cylinder, a stud chuck carrier in fixed relation to the piston and disposed beneath the body, a ram slidable in the bore and extending outwardly therefrom, a solenoid coil within the body and surrounding the outer part of the bore, an armature in fixed relation to the ram, a handle member applied to the body, a fluid filling the passage, the bore and the cylinder beneath the piston and beneath the ram, and a spring acting upon the piston assembly in the direction to move the stud chuck carrier outwardly, and supporting means upon the body for the support of the apparatus upon the surface upon which the studs are required to be welded.

14. Electric arc stud welding apparatus according to claim 13, having an annular storage chamber of variable capacity surrounding the ram bore intermediate the cylinder and the solenoid coil, the said storage chamber communicating with the bore at a position beneath the ram when the ram is at its outermost limit of travel.

15. Electric arc stud welding apparatus according to claim 13, having an annular storage chamber of variable capacity surrounding the ram bore intermediate the cylinder and the solenoid coil, the said storage chamber communicating with the bore at a position beneath the ram when the ram is at its outermost limit of travel, and a regulating valve mounted in the said body for determining the cross-sectional area of the passage extending between the bore and the cylinder.

16. Electric arc stud welding apparatus comprising a body, separated compartments in the said body, a solenoid in one of the said compartments, a core axially disposed in relation to and movable in the coil of the said solenoid, a stem upon the said core projecting always from the said coil, a fitting in the second compartment of the body, comprising, in parallel relation, two cylinders communicating at the lower ends within the said fitting, a ram slidably mounted in one of the said cylinders, a piston slidably mounted in the second of the said cylinders, perforations in the first cylinder beneath the ram when the latter is in the outermost position, a motion-transmitting member disposed between the ram and the stem of the solenoid core, a cross-head in fixed relation to the upper part of the piston, a guide member parallel with the piston and also in fixed relation to the cross-head, a carrier supported by the guide member, a stud chuck upon the said carrier, a spring acting upon the piston and chuck assembly to move the chuck outwardly, and a fluid in the second compartment flooding the said fitting.

17. Electric arc stud welding apparatus according to claim 16, in which a regulating valve is mounted in the said fitting intermediate the two cylinders and determines the cross-sectional area for communication between the two cylinders.

18. Electric arc stud welding apparatus comprising a body, two chambers in the said body in spaced relation and communicating by a passage at their inner ends, two elements respectively adapted for reciprocation in the two chambers, means applied to the first of the said elements to tend to move it in the direction to reduce the capacity of the corresponding chamber, a fluid medium filling the free spaces at the inner ends of the chambers and the communicating passage, operating means for moving the second element against the resistance of the means acting upon the first element and a stud chuck in fixed relation with the first element.

19. Electric arc stud welding apparatus according to claim 18, having a storage chamber of variable capacity communicating with the fluid-filled space in the second chamber adjacent the inner end of the second element when the latter is in its outermost position.

ARTHUR RATCLIFFE AINSWORTH.

REFERENCES CITED

The following references are of record in the file of this patent:

UNITED STATES PATENTS

| Number | Name | Date |
|---|---|---|
| 1,523,667 | Steele et al. | Jan. 20, 1925 |